United States Patent [19]

Bars

[11] 4,319,093
[45] Mar. 9, 1982

[54] TRANSMISSION BRIDGE FOR A SUBSCRIBER SET

[75] Inventor: Gérard Bars, Pleumeur Bodou, France

[73] Assignee: Compagnie Industrielle des Telecommunications Cit-Alcatel, Paris, France

[21] Appl. No.: 169,255

[22] Filed: Jul. 16, 1980

[30] Foreign Application Priority Data

Jul. 17, 1979 [FR] France .................. 79 18450

[51] Int. Cl.³ .............................. H04M 19/00
[52] U.S. Cl. .................. 179/23; 179/16 AA; 179/70; 179/170 D
[58] Field of Search ............ 179/18 FA, 18 F, 23, 179/70, 77, 170 D, 16 AA

[56] References Cited

U.S. PATENT DOCUMENTS 4,241,239 12/1980 Pernyeszi .................. 179/70

Primary Examiner—Thomas W. Brown
Attorney, Agent, or Firm—Sughrue, Mion, Zinn, Macpeak & Seas

[57] ABSTRACT

The invention concerns feeding current to a subscriber set. In addition to an isolation transformer (T) the transmission bridge includes a measuring circuit (4) connected to the subscriber line, and a receive circuit (7), with the measuring circuit connected to the receive circuit via an impedance adjusting circuit (6). The receive circuit is connected to a receive terminal (10) and is arranged to forward the signal received therefrom to the transformer. The bridge also includes a send circuit (9), likewise connected to the measuring circuit and receiving the signal at the receive terminal via a balance circuit (8) for cancelling the signal delivered by the send circuit while the subscriber set is receiving. Application to telephony.

4 Claims, 2 Drawing Figures

TRANSMISSION BRIDGE FOR A SUBSCRIBER SET

The present invention concerns feeding current to a subscriber set via an isolation transformer. Transmission bridges which include a transformer for providing isolation, generally have three major drawbacks: since the DC flows through the bridge-forming secondary half-windings that are connected to the subscriber set by the subscriber line, it is necessary either to dimension the transformer as a function of the DC, which leads to a very bulky transformer, or to compensate the DC by means of a supplementary winding, which leads to relatively sophisticated circuits and to additional power consumption; it is necessary to insert a capacitor between the secondary half-windings in order to decouple the DC bridge; and by virtue of the presence of the capacitor in conjunction with the inductance of the transformer (usually less than 1 henry) the low frequency loss in telephone band is not negligible (between 0.5 and 1dB at 300 Hz).

Preferred embodiments of the present invention remedy these drawbacks.

SUMMARY OF THE INVENTION

The invention provides a transmission bridge for feeding current to a subscriber set, the bridge comprising: an isolation transformer, a measuring circuit, a receive circuit connected to a receive terminal, and a send circuit; the transformer having a primary winding and a secondary winding constituted by two secondary half-windings, each secondary half-winding being connected in series with a respective resistance to constitute respective first and second circuits, the first circuit being connected to one polarity of a DC source and to one wire of a subscriber line, and the other circuit being connected to the other polarity of the said DC source and to the other wire of the subscriber line, the measuring circuit having respective inputs connected to the terminals of each of the resistances of the said first and second circuits, wherein the receive circuit has an input connected to the output of the measuring circuit via an impedance adjusting circuit, the output of the receive circuit being directly connected to the primary winding of the transformer.

BRIEF DESCRIPTION OF THE DRAWINGS

The invention is described by way of example with reference to the accompanying drawings in which.

DESCRIPTION OF THE PREFERRED EMBODIMENT

Figure 1:
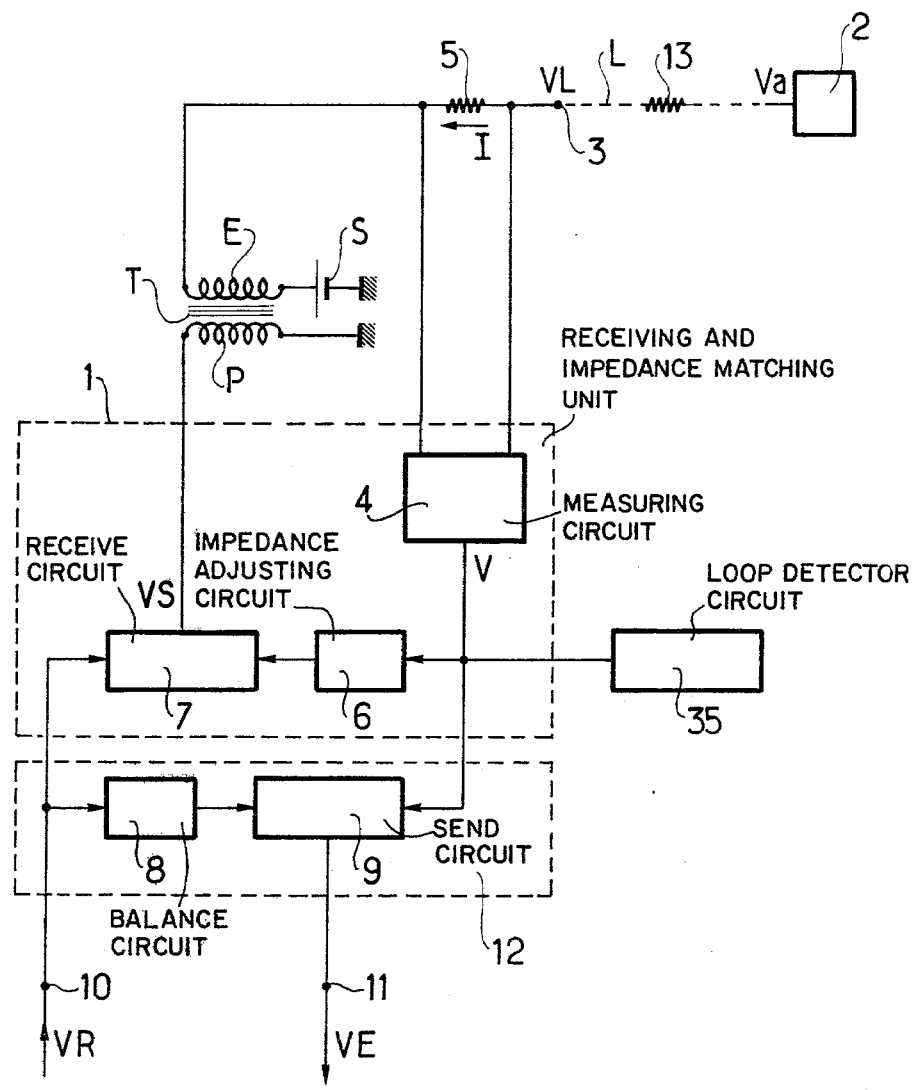
FIG. 1 is a block diagram of a bridge in accordance with the invention.

FIG. 1 is a block diagram of a transmission bridge in accordance with the invention. In the figure T designates a transformer, 1 a receiving and impedance matching unit, 12 a sending unit, 35 a loop detector circuit, 5 a resistance of value R connected to a terminal 3, and 2 a subscriber set connected by a subscriber line L to the terminal 3. The impedance of the subscriber line L and the subscriber set 2, as seen from the terminal 3 is represented by a resistance 13 of value Ro.

The receiving and impedance matching unit 1 comprises a measuring circuit 4, an impedance adjusting circuit 6 and a receive circuit 7. The sensing unit 12 comprises a send circuit 9 and a balance circuit 8.

The transformer T has a primary winding P with one end grounded and its other end connected to the output of the receive circuit 7, and a secondary winding E with one end connected to the resistance 5 and its other end grounded via a DC source S. The turn ratio of the transformer T will be taken to be equal to unity. The input to the measuring circuit 4 is connected across the terminals of the resistance 5 and its output is connected to an input of the receive circuit 7 via an impedance adjusting circuit 6. Another input to the receive circuit is connected to a receive terminal 10. The output of the measuring circuit 4 is further connected to an input of the send circuit 9 whose output is connected to send terminal 11. The balance circuit 8 has its input connected to the receive terminal 10 and its output connected to another input of the send circuit 9. Various voltages and currents are designated as follows: VL is the voltage at the terminal 3; I is a current flowing through the resistance 5; VS is the voltage at the output of the receive circuit 7; V is the voltage at the output of the measuring circuit 4; VR is the voltage of the receive terminal 10; Va is the voltage at the subscriber set when sending; and VE is the voltage at the send terminal 11. The loop detector circuit 12 has its output connected to the measuring circuit 4. The voltage V at the output of the measuring circuit 4 is given by V=RI. The impedance adjusting circuit 6 delivers an output voltage K1·RI, while the balance circuit 8 delivers an output voltage K2·VR. The send and receive circuits are adders which sum the signals applied thereto. The voltage at the output of the receive circuit 7 is VS=VR+K1.RI. The voltage at the output of the send circuit 9 is VE=VR+K2.RI.

In order for the transmission bridge to be matched to the line L of the subscriber set 2, its input impedance, i.e. (VL/I) must equal Ro, when VR=0. The current I is given by $$I = \frac{VL - VS}{R} = \frac{VL - K_i \cdot RI}{R};$$

and to make the input impedance equal to Ro, it is necessary that:

$$K1 = \frac{Ro - R}{R} \quad (1)$$

When sending, the voltage VE delivered by the send curcuit 9, for VR=0 is VE=RI. When the input impedance is equal to Ro, VL=Va−RoI=RoI, whence Va=2RoI. From which it follows $$VE = \frac{R \cdot Va}{2Ro} \quad (2)$$

$$\text{whence } \frac{2VE}{Va} = \frac{R}{Ro}$$

When receiving, for Va=0, we have $$VL = \frac{Ro}{R + Ro} \cdot VS = \frac{Ro}{R + Ro} [VR + (Ro - R)I]$$

$$\text{and } I = -\frac{VL}{Ro}$$

from which it can be deduced:

$$\frac{2VL}{VR} = 1 \tag{3}$$

This shows that when receiving, the transmission bridge behaves as a generator of e.m.f. VR with an output impedance of Ro.

The bridge is balanced by having VE=0 when Va=0, i.e. while not sending. For this to be true, K2·VR+RI=0. From equation (3) it can be deduced that VL=(VR/2) since the receive current is I=VL/R. Whence K2.VR−R/2Ro=0 whence:

$$K2 = \frac{R}{2Ro} \tag{4}$$

The above results show that provided the conditions given in equations (1) and (4) are observed and that VS=VR+K1.RI at all frequencies:
  the input impedance is equal to Ro;
  when sending the gain is equal to (R/Ro);
  when receiving the gain is equal to 1, and
  the balance is perfect for a line of impedance Ro.
Finally, providing the measuring circuit 4 can pass DC, it is possible to use its output voltage V=RI for loop detection (for on-hook/off-hook signalling from the subscriber set).

Figure 2:
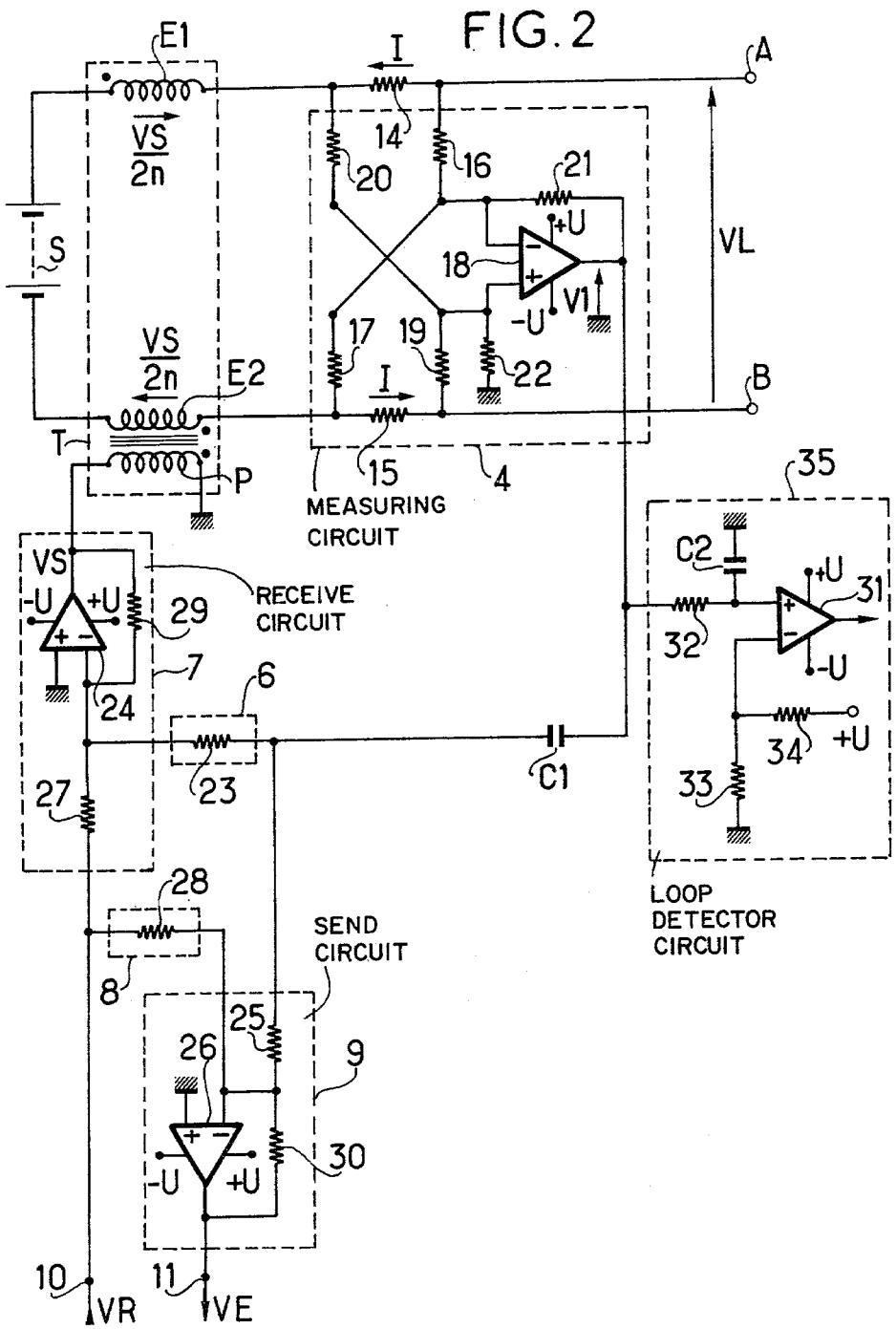
FIG. 2 is a circuit diagram of one particular embodiment of the bridge shown in FIG. 1.

FIG. 2 shows an embodiment of the transmission bridge outlined in FIG. 1. Two terminals A and B are connected to the subscriber set via the subscriber line. The terminal A is connected to the positive polarity of the DC source S, via the resistor 14 and a secondary half-winding E1, while the terminal B is connected to the negative polarity of the DC source via a resistor 15 and a secondary half-winding E2. The resistors 14 and 15 have the same value of R/2, where R designates the value of the resistance 5 in FIG. 1. The terminal A is connected to a point common to the resistor 15 and the half-winding E2 via two resistors 16 and 17 connected in series with their common point connected to a negative input of an operational amplifier 18. The terminal B is connected to the point common to the resistor 14 and the half winding E1 by two resistors 19 and 20 connected in series with their common point connected to a positive input of the operational amplifier 18. All four resistors 16, 17, 19 and 20 are identical and have the same value R1. The output of the operational amplifier 18 is connected via a resistor 21 to its negative input. The positive input of the operational amplifier 18 is grounded via a resistor 22, identical to that connecting the output to the negative input, the resistors 21 and 22 having a value R2. The output of the operational amplifier 18 is connected via a capacitor C1 to a negative input of an operational amplifier 24 via a resistor 23 of value R3 and also to a negative input of an operational amplifier 26 via a resistor 25 of value R7. The receive terminal 10 is connected to the negative input of the operational amplifier 24 via a resistor 27 of value R5 and to the negative input of the operational amplifier 26 via a resistor 28 of value R6. The positive input of each of the operational amplifiers 24 and 26 is grounded. The output of the operational amplifier 24 is connected to its negative input via a resistor 29 of value R4 and to ground via a primary winding P. The primary winding P and the secondary half-windings E1 and E2 belong to the transformer T in which the ratio of the turns in the secondary winding constituted by the secondary half-windings E1 and E2 to the number of turns in the primary winding P is 1/n. The voltage at the terminals of the secondary winding is designated V2 with each of the secondary half-windings having a voltage V2/2=VS/2n across its terminals. The operational amplifier 26 has its output connected to the send terminal 11 and to its own negative input via a resistor 30 of value R8.

The loop detector circuit 35 comprises an operational amplifier 31 with a positive input connected to ground via a capacitor C2 and to the output of the operational amplifier 18 via a resistor 32 of value R9. The negative input of the operational amplifier 31 is connected to ground via a resistor 33 of value R11, and to a voltage +U via a resistor 34 of value R10.

The power supply to the four operational amplifiers 18, 24, 26 and 31 is from the voltages +U and −U.

The measuring circuit 4 of FIG. 1 is constituted by the four resistors 16,17,19 and 20, the two resistors 21 and 22, and the operational amplifier 18.

The receive circuit 7 of FIG. 1 is constituted by the resistor 27 and 29 and the operational amplifier 24. The send circuit 9 of FIG. 1 is constituted by the resistors 25 and 30 and the operational amplifier 26. The impedance adjusting circuit 6 of FIG. 1 is constituted by the resistor 23.

The balance circuit 8 of FIG. 1 is constituted by the resistor 28.

The voltage V1 at the output of the operational amplifier 18 is:

$$|V1| = |RI| \cdot \frac{R2}{2R1} \tag{5}$$

where I is the current flowing through the resistors 14 and 15, each having the resistance value of R/2. The accuracy of the loop detection threshold for the loop detector circuit 35 depends on the accuracy of the resistors 16, 17, 19, 20, 21 and 22. The RC network 32, C2 filters the AC component from the voltage V1. Designating the detectable threshold current as Is, we have:

$$RIs \cdot \frac{R2}{2R1} = U \frac{R11}{R10 + R11} \tag{6}$$

whence:

$$Is = \frac{U}{R} \cdot \frac{2R1}{R2} \cdot \frac{R11}{R10 + R11}$$

The output voltage of the receive circuit 7 is VS. The voltage across the terminals of each secondary half-winding E1, E2 is thus VS/2n, and the voltage V2 across the secondary winding is the sum of the voltages across the secondary half-windings, whence:

$$V2 = \frac{|VS|}{n} = \frac{1}{n}\left(VR\frac{R4}{R5} + V1\frac{R4}{R3}\right) \tag{7}$$

The current I is given by:

$$I = \frac{VL - V2}{R}$$

for VR=0.

The input impedance should be equal to Ro, whence:

$$I = \frac{VL}{Ro} + \frac{VL}{R} - \frac{V1}{nR} \cdot \frac{R4}{R3}$$

-continued $$\text{with } V1 = RI \cdot \frac{R2}{2R1} = \frac{RVL}{Ro} \cdot \frac{R2}{2R1}$$

It can be shown:

$$\frac{1}{Ro} = \frac{1}{R} - \frac{1}{Ro} \cdot \frac{1}{n} \cdot \frac{R2}{2R1} \cdot \frac{R4}{R3} \quad (8)$$

whence:

$$R3 = \frac{1}{n} \cdot \frac{R2}{2R1} \cdot R4 \cdot \frac{R}{Ro - R}$$

The resistor 23 of value R3, makes it possible to adjust the input impedance to the impedance value of each subscriber set. During reception, for Va=0

$$VL = \frac{Ro}{R + Ro} \cdot V2 \text{ and } I = -\frac{VL}{Ro}$$

with V2 being given by equation (7). From which it can be deduced:

$$\frac{2VL}{VR} = \frac{1}{n} \cdot \frac{R4}{R5} \quad (9)$$

Equation (9) should be compared with equation (3). The resistor 27 of value R5 makes it possible to adjust the gain in the received direction and thus to have a gain greater than 1. When sending, i.e. for VR=0, the voltage supplied by the operational amplifier 15 is $$VE = V1 \cdot \frac{R8}{R7}$$

$$\text{whence } VE = RI \cdot \frac{R2}{ER1} \cdot \frac{R8}{R7}.$$

Since the input impedance is equal to Ro and Va is the output voltage from the subscriber set, Va=2RoI. From which it may be deduced $$\frac{2VE}{Va} = \frac{R}{Ro} \cdot \left( \frac{R8}{R7} \cdot \frac{R2}{2R1} \right) \quad (10)$$

This equation should be compared with equation (2). The resistance 25 of value R7 makes it possible to adjust the gain in the send direction and to have a gain greater than (R/Ro). The balance condition, i.e. VE=0, when Va=0 can be expressed as $$VR \cdot \frac{R8}{R6} = -V1 \cdot \frac{R8}{R7} = -RI \cdot \frac{R2}{2R1} \cdot \frac{R8}{R7}$$

When Va=0, I=−(VL/Ro) since the transmission bridge feeds the line connected to the terminals A and B, when receiving, and the impedance seen from the terminal A and B is equal to Ro. Thus, taking equation (9) into account, $$\frac{1}{R6} = + \frac{R}{Ro} \cdot \frac{1}{4n} \cdot \frac{R4}{R5} \cdot \frac{R2}{R1} \cdot \frac{1}{R7}$$

which can be written $$R6 = 4n \cdot R7 \cdot \frac{Ro}{R} \cdot \frac{R1 \cdot R5}{R4 \cdot R2} \quad (11)$$

The resistor 28 of value R6 thus makes it possible to adjust the send circuit so that VE=0 when Va=0.

We now turn to the design of the ransformer T. Let V2 max be the maximum output voltage from the transformer and i max be the maximum current that can be supplied by the operational amplifier 24. Let L2 be the inductance of the secondary winding (which comprises both secondary half-windings E1 and E2) of the transformer T when DC is flowing therethrough, and let F min be the lowest frequency to be transmitted. Since the output voltage from the operational amplifier 24 is VS and supposing that the resistance of the primary winding P is small, the practical value for i is i=VS/L1ω, where i is the output current from the operational amplifier and L1 is the inductance of the primary winding. At maximum current i max and the corresponding maximum output voltage VS max the minimum inductance L1 min corresponding to the lowest frequency F min can be deduced at $$L1 \text{ min} = \frac{VS \text{ max}}{2\pi \cdot F \text{ min} \cdot i \text{ max}}$$

and since the primary/secondary turns ratio is n, the corresponding secondary inductance is:

$$L2 \text{ min} = \frac{VS \text{ max}}{n^2 \cdot 2\pi \cdot F \text{ min} \cdot i \text{ max}}$$

$$\text{or } L2 \text{ min} = \frac{V2 \text{ max}}{n \cdot 2\pi \cdot F \text{ min} \cdot i \text{ max}}$$

where L2 min is the inductance of the secondary which corresponds to the low frequency F min to be transmitted. This inductance is inversely proportional to the turns ratio n. n should thus be chosen as large as possible in order to obtain an L2 min that is as small as possible. The transformer is thus a step-down transformer.

Putting
V2 max=2 volts
i max=10 milliamps
F min=300 Hz
and putting
n=4, one obtains:
L2 min=26.5 millihenrys.

This value should be compared to that of the inductances currently used which is of the order of 600 millihenrys, giving a ratio of about 5:1 between the DC ampturns.

In FIG. 2, the capacitor C1 eliminates the DC component in the output signal from the operational amplifier 18, and the time constants R3.C1 and R7.C1 are chosen to be sufficiently great to avoid reducing the passband.

The transmission bridge in accordance with the invention thus makes it possible to feed a subscriber set without a line decoupling capacitor and using a transformer in which the number of turns in the winding that are required to transmit Dc is greatly reduced, by a factor of about 5, with respect to transmission bridges currently in use. This leads to a much less bulky transformer.

Also with respect to current equipment, the transmission bridge in accordance with the present invention has the following advantages: undulation-free passband, particularly at low frequencies, in both the send and the receive directions; and a constant input impedance free from imaginary terms over the entire bands.

Furthermore, the transmission bridge directly performs two-wire to four-wire conversion and facilitates loop detection.

I claim:

1. A transmission bridge for feeding current to a subscriber set, the bridge comprising: an isolation transformer, a measuring circuit, a receive circuit connected to a receive terminal, and a send circuit; the transformer having a primary winding and a secondary winding constituted by two secondary half-windings, each secondary half-winding being connected in series with a respective resistance to constitute respective first and second circuits, the first circuit being connected to one polarity of a DC source and to one wire of a subscriber line, and the other circuit being connected to the other polarity of the said DC source and to the other wire of the subscriber line, the measuring circuit having respective inputs connected to the terminals of each of the resistances of the said first and second circuits; wherein the receive circuit has an input connected to the output of the measuring circuit via an impedance adjusting circuit, the output of the receive circuit being directly connected to the primary winding of the transformer.

2. A bridge according to claim 1, wherein the send circuit has an input connected to the output of the measuring circuit and another input connected to the receive terminal via a balance circuit.

3. A bridge according to claim 1, wherein the receive circuit includes an operational amplifier and wherein a positive input to the amplifier is grounded and a negative input to the amplifier is connected to the receive terminal via a resistance and to the output of the amplifier via another resistance, and wherein the impedance adjusting circuit is constituted by a resistance connected between the output of the measuring circuit and the said negative input.

4. A bridge according to claim 2, wherein the send circuit includes an operational amplifier and wherein a positive input to the amplifier is grounded and a negative input to the amplifier is connected to the output of the measuring circuit via a resistance and to the output of the amplifier via another resistance, and wherein the balance circuit is constituted by a resistance connected between the said negative input and the receive terminal.

* * * * *